United States Patent [19]

Braun

[11] 4,254,845

[45] Mar. 10, 1981

[54] BRAKING SYSTEM FOR CONSTRUCTION MACHINES

[76] Inventor: Günther Braun, Haubahn 26, 56 Wuppertal, Fed. Rep. of Germany

[21] Appl. No.: 936,870

[22] Filed: Aug. 25, 1978

[30] Foreign Application Priority Data

Sep. 6, 1977 [DE] Fed. Rep. of Germany ....... 2739994

[51] Int. Cl.³ ............................................. B60K 17/34
[52] U.S. Cl. ................................... 180/306; 180/244; 180/308; 188/170
[58] Field of Search ..................... 180/306, 308, 65 F, 180/307, 242, 305, 244; 188/170

[56] References Cited

U.S. PATENT DOCUMENTS

| | | | |
|---|---|---|---|
| 3,138,218 | 6/1964 | Mark et al. | 180/308 X |
| 3,507,125 | 4/1970 | Vaughan et al. | 180/308 X |
| 3,641,765 | 2/1972 | Hancock et al. | 180/308 X |
| 3,780,820 | 12/1973 | Schwab et al. | 180/305 X |
| 4,185,713 | 1/1980 | Williams et al. | 180/308 X |

*Primary Examiner*—John J. Love
*Assistant Examiner*—Michael Mar
*Attorney, Agent, or Firm*—Laney, Dougherty, Hessin & Beavers

[57] ABSTRACT

A braking system is provided for a construction machine, including a ground engaging drive apparatus. The construction machine includes a hydraulic drive system, including a hydraulic motor connected to the ground engaging drive apparatus and a first hydraulic pump for supplying fluid under pressure to the motor, the pump and motor being connected so that a braking force may be applied to the drive apparatus by varying the discharge volume of the first pump. A first valve is connected between an inlet and an outlet of the first pump for shunting the pump. An emergency brake is connected to the ground engaging drive apparatus, and is mechanically biased in a brake applying direction. A second hydraulic pump supplies fluid to a hydraulic actuator for releasing the emergency brake. A second valve is located between the second pump and the hydraulic actuating means. A common actuator is connected to the first and second valves and is variable between a first position wherein the first valve is closed and the second valve is open, and a second position wherein the first valve is open and the second valve is closed. A sensor detects movement of the common actuating actuator between the first and second positions, and causes fluid pressure to be relieved from the hydraulic actuator so that the emergency brake is applied before the second valve is closed. Downstream of the second valve is an auxiliary pump for supplying pressure to release the emergency brake when the common actuating handle is in its second position.

17 Claims, 2 Drawing Figures

BRAKING SYSTEM FOR CONSTRUCTION MACHINES

BACKGROUND OF THE INVENTION

1. Field of the Invention

This invention relates generally to construction machines, and more particularly, but not by way of limitation, to improved braking systems for hydraulically powered road rollers.

2. Description of the Prior Art

The invention relates to a braking system for construction machines, in particular for road rollers having hydraulic propelling drive, wherein brakes, which are biased in brake-applying direction by mechanical means, are held in released state by brake releasing pressure in a brake releasing circuit by means of hydraulic actuating members, the brake releasing pressure being generated by an operational releasing pressure pump which together with a hydraulic pump for the propelling drive is coupled to a prime mover, wherein the brake releasing circuit is arranged to be connected to the reservoir through an electrically controlled valve which is held in its position closing the brake releasing circuit by electric auxiliary power, wherein, in addition, a shunt conduit is provided between the inlet and outlet ports of the propelling drive hydraulic pump and contains a first shut-off valve, wherein furthermore the connecting conduit from the operational releasing pressure pump to the hydraulic actuating members is arranged to be shut off by a second shut-off valve arranged downstream of the electrically controlled valve, and wherein an auxiliary releasing pressure pump arranged to be actuated by muscular power is connected to the brake releasing circuit downstream of the second shut-off valve.

Construction machines, in particular road rollers, having hydraulic propelling drive comprises a hydraulic pump, which is coupled to the prime mover, as well as hydraulic motors on the driven wheels or roller drums. The discharge volume of the hydraulic pump which is usually an axial piston pump, is variable, in order to be able to regulate the travelling speed. When the hydraulic pump is set to zero stroke, it will, at the same time, act as a brake. Namely if the roller drum or wheels would tend to continue to roll with zero stroke of the axial piston pump, the hydraulic motors coupled thereto would tend to act as pumps and to supply oil to the hydraulic pump, now acting as a hydraulic motor. As, however, the intake volume of this "motor" is zero, the roller drums or wheels are hydraulically locked through the hydraulic motors. In normal operation such a construction machine having hydraulic propelling drive is braked by means of the propelling drive itself by varying the hydraulic pump.

For safety reasons, however, an additional braking system is provided, which permits "emergency braking", if, for example, the hydraulic system of the propelling drive becomes leaky on a slope and is no longer able to take charge of this braking function. Apart from this, this additional braking system can serve to initiate automatic braking upon occurrence of other conditions, if, for example, the operator leaves the construction machine, while it is in motion. The additional braking system comprises brakes which are biased in brake-applying direction by mechanical means and which are held in their released states by brake releasing pressure in a brake releasing circuit by means of hydraulic actuating members. Actuation of these brakes is effected purely mechanically without hydraulic auxiliary power being required. Actuation of the brakes is effected also and just in that case, when the hydraulic auxiliary power fails. The actuation of this additional braking system is effected by means of a valve through which the brake releasing circuit can be connected to the reservoir. As this valve is to be controlled depending on various functions, it is constructed as an electrically controlled valve which is retained by electric auxiliary power in its position closing the brake releasing circuit. The brake releasing pressure is generated by an operational releasing pressure pump, which together with the hydraulic pump for the propelling drive is coupled to the prime mover.

With such an arrangement problems would arise if the hydraulic and/or electric auxiliary power of the construction machine had failed and the construction machine were to be towed away. As the hydraulic pump for the propelling drive is standing still with the prime mover not running and therefore is not able to accommodate any oil, and, on the other hand, the drive motors would act as pumps, when the construction machine is towed, there would be hydraulic locking of the roller drums or wheels by the hydraulic system of the propelling drive, similar to the setting of the hydraulic pump to zero stroke. In addition the brake releasing pressure would cease and, with failure of the electric auxiliary power, the electrically controlled valve would connect the brake releasing circuit to the reservoir. Thereby the brakes of the additional braking system would be applied.

This is prevented by particular measures to permit towing.

Firstly a shunt conduit between inlet and outlet ports of the propelling drive hydraulic pump is provided. A first shut-off valve, which is normally closed, is located in this shunt conduit. By opening this shut-off valve the hydraulic pump of the propelling drive can be shunted, whereby the locking of the hydraulic motors is eliminated.

Furthermore a second shut-off valve is provided, by which the connecting conduit from the operative releasing pressure pump to the hydraulic actuating members downstream of the electrically controlled valve can be shut off. Thereby communication between the brake releasing circuit, on one hand, and both the operative releasing pressure pump and the electrically controlled valve, is interrupted which is connected to reservoir even with failure of the current supply. An auxiliary releasing pressure pump arranged to be actuated by muscular power is connected to the brake releasing circuit downstream of the second shut-off valve. This auxiliary releasing pressure pump permits building up a pressure in the brake releasing circuit independently of any auxiliary power, and releasing the brakes of the additional braking system.

Then the construction machine can be towed.

With this prior art arrangement dangerous situations due to faulty manipulation can occur. Namely if after towing and restarting of the construction machine the first shut-off valve is closed again but the operator forgets to open the second shut-off valve again, the brakes of the additional braking system will remain released. The construction machine can be operated normally with the propelling drive and can be braked, if necessary. However it is not possible to actuate the additional braking system by changing the electrically controlled valve over, as the second shut-off valve is closed between this electrically controlled valve and the brake releasing circuit proper. This deficiency will remain unnoticed at first. In a dangerous situation, however, it will be found impossible to apply the brakes of the additional braking system. The second shut-off valve has, however, to be located downstream of the electrically controlled valve, as otherwise it would not be possible to shut the brake releasing circuit off towards the reservoir in the case of a failure of the electric auxiliary power.

SUMMARY OF THE INVENTION

It is the object of the invention to construct a braking system of the type defined in the beginning such that the faulty manipulation described cannot occur.

According to the invention, this object is achieved in that the first and second shut-off valves are coupled with each other and are arranged to be actuated by a common actuating member such that the second shut-off valve is closed automatically, when the first shut-off valve is opened, and vice versa, and that a sensor responding to the actuating movement of the actuating member is provided thereon, and is arranged to control the electrically controlled valve in the opening sense prior to the complete opening of the first shut-off valve and to the closing of the second shut-off valve.

The coupling of the first and second shut-off valves makes sure that the second shut-off valve is automatically opened again, when the first shut-off valve is closed again. It could, however, happen that the actuating member for these two shut-off valves is changed over erroneously, while the construction machine is located, for example, on a slope with the prime mover working. In this case the braking action of the propelling drive would be eliminated and, without additional measures, actuation of the additional braking system would be prevented. This risk is eliminated by the further feature of the invention. Namely in that moment, when the actuating member is changed over from its normal operating position, the electrically controlled valve will be changed over by an additional sensor. Thus the brake releasing circuit is connected to the reservoir at once and is no longer pressurized, before the second shut-off valve reaches its closing position.

It is therefore an object of the present invention to provide an improved braking system for construction machines.

Another object of the present invention is the provision of a safer braking system for hydraulically propelled construction machines.

Yet another object of the present invention is the provision of a common actuating means to require the second valve between the second pump and the emergency brake release means to be automatically opened when the first valve shunting the first hydraulic drive pump is closed.

And another object of the present invention is the provision of a means for relieving fluid pressure from the emergency brake release means to allow said brake to be applied, as the valve between the second pump and the release means is closed, so that said emergency brake is applied before said valve is fully closed.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

An embodiment of the invention will now be described with reference to the accompanying drawings.

DESCRIPTION OF THE PREFERRED EMBODIMENTS

Figure 1:
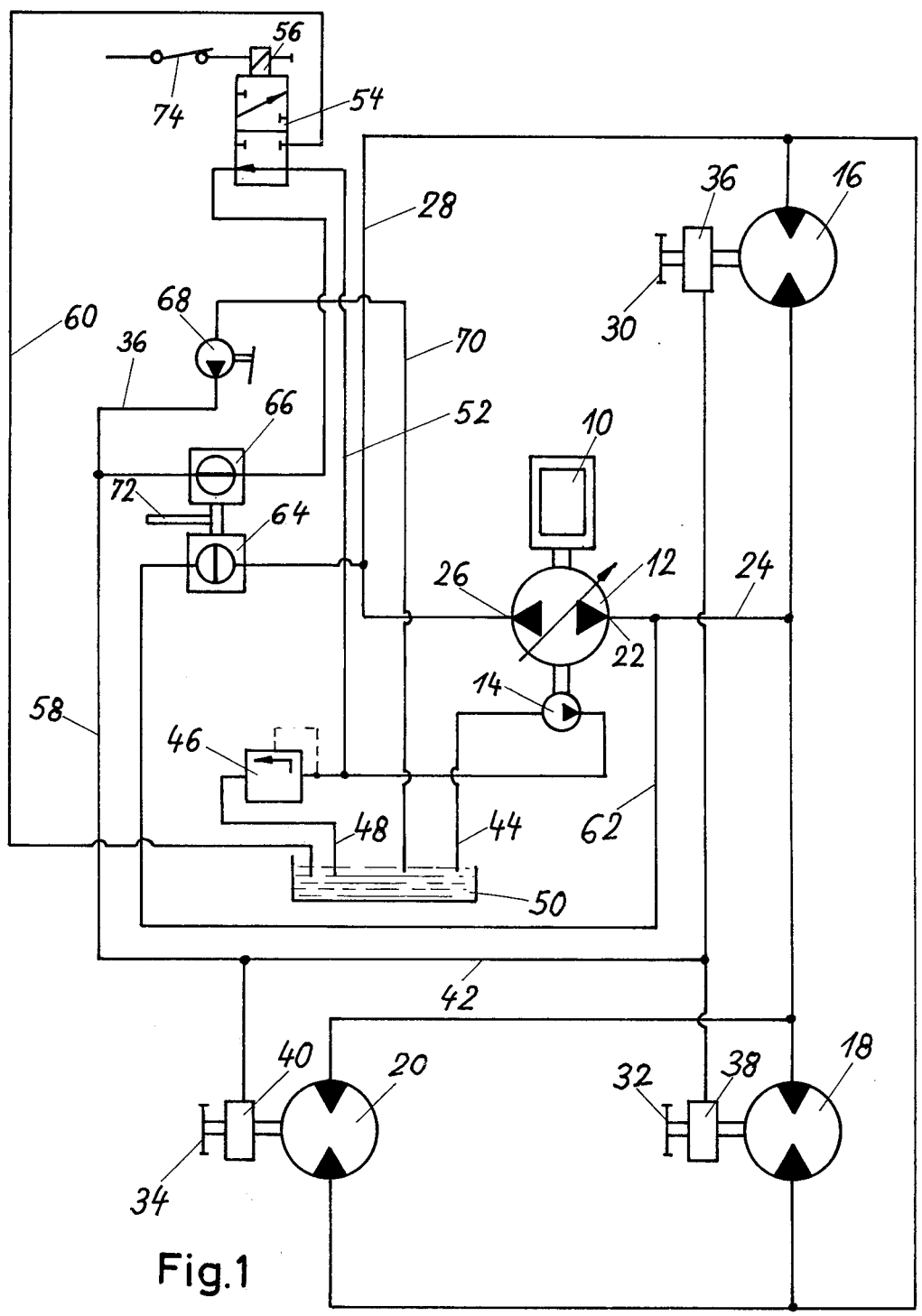
FIG. 1 illustrates a hydraulic circuit diagram of a braking system of the invention.

An internal combustion engine 10 drives a variable-discharge hydraulic pump 12 also referred to as the hydraulic drive supply pump for the propelling drive and a operational releasing pressure pump 14, the former pump being an axial piston pump. In the embodiment illustrated, the propelling drive comprises three hydraulic motors 16,18,20 which are connected in parallel between a supply conduit 24 communicating with the outlet port 22 of the hydraulic pump and a return conduit 28 communicating with the inlet port of the hydraulic pump 12. A roller drum 30 is driven by the hydraulic motor 16, wheels 32 and 34 are driven by the hydraulic motors 18 and 20. Roller drum 30 and wheels 32 and 34 may each be generally referred to as a ground engaging drive means. This is shown only schematically in FIG. 1.

Hydraulically releasable brakes 36,38 and 40 are provided at the roller drum 30 and at the wheels 32 and 34, respectively. These emergency brakes are biased in brake-applying direction by mechanical means in known manner, which has therefore not been illustrated, and are held in their released states by hydraulic actuating members. The emergency brakes 36, 38 and 40 apply a force to retard the motion of the ground engaging drive means 30, 32 and 34, so long as there is an absence of a brake releasing force. The hydraulic actuating members are connected to a brake releasing circuit 42. This brake releasing circuit 42 comprises an intake conduit 44, the operational releasing pressure pump 14, which is connected through a biased overflow valve 46 to a return conduit 48 to the reservoir 50, as well as a conduit 52, which is led to an electrically controlled valve 54. Pump 14 provides a source of hydraulic fluid under pressure. The electrically controlled valve is a 4/2-directional control valve which is arranged to be changed over from the valve position shown into its other valve position by means of a solenoid 56. In the valve position shown communication between the conduit 52 and a conduit 58 leading to the actuating members of the brakes 36,38,40 can be established. In the other valve position of the electrically controlled valve 54, the conduit 52 is shut off. The discharge volume of the operational releasing pressure pump 14 flows back through the overflow valve 46. The brake releasing circuit 42 communicates with a drain conduit 60 through conduit 58 and valve 54. The inlet and outlet ports 26 and 22, respectively, of the hydraulic pump 12 are interconnected by a shunt or bypass conduit 62. A first shut-off valve 64 is located in the shunt conduit 62. A second shut-off valve 66 is arranged in the conduit 58, which connects the hydraulic actuating members at the brakes 36,38,40 to the electrically controlled valve 54.

When first shut-off valve 64 is closed, the inlet port 26 and outlet port 22 are said to be in fluid isolation. When valve 64 is open, those ports are said to be in fluid communication.

A pump 68 (auxiliary releasing pump) adapted to be operated by muscular power is connected to the brake releasing circuit 42 downstream of the second shut-off valve 66 and is adapted to suck in oil from the reservoir 50 through an intake conduit 70.

The two shut-off valves 64 and 66 are coupled with each other and are arranged to be actuated by a common actuating member 72 in the form of a pivoted lever. As can be seen from FIG. 1, the first shut-off valve 64 is closed and the second shut-off valve 66 is opened in a first valve position. This is the normal operative position. In another valve position the first shut-off valve 64 is opened and the second shut-off valve 66 is closed. During the changing-over of the actuating member 72 from its normal operative position to its other position a sensor in the form of a switch 74 is actuated, which is connected into the circuit of the solenoid 56 of the electrically controlled valve 54. When the actuating member 72 is moved out of its normal operative position, the switch 74 will be opened thereby de-energizing solenoid 56. The valve 54 moves into its second valve position in which the brake releasing circuit 42 is connected to the drain conduit 60 and reservoir.

The valve 54, switch 74 and drain conduit 60 provide a means for relieving fluid pressure from the brake releasing circuit 42 by connecting brake releasing circuit 42 to the relatively low pressure reservoir 50, thereby deactivating the emergency brake release means. Control valve 54 is said to provide a means for activating the pressure relieving means just described.

The arrangement described operates as follows:

When the hydraulic and/or electric auxiliary power fails, the brake releasing circuit 42 will be connected to the drain conduit 60 through the valve 54. The brakes 36,38 and 40 are applied. In order to tow the vehicle, the actuating member 72 is shifted. Thereby the hydraulic pump 12 is by-passed so that the hydraulic locking of the hydraulic motors 16,18 and 20 is removed. At the same time the brake releasing circuit 42 is separated from the opened valve 54 by the second shut-off valve 66. By means of the auxiliary releasing pressure pump 68 a pressure may be built up within the brake releasing circuit, whereby the brakes 36,38,40 are released. It is now possible to tow the construction machine. When the construction machine is then to be put into normal operation again, this can only be done by closing the first shut-off valve 64 again. Thereby, however, the second shut-off valve 66 is automatically opened again. The opening of the second shut-off valve 66 cannot be forgotten.

If for some reason or other the actuating member 72 is shifted during normal operation from the position shown in FIG. 1 into its other position, the switch 74 will be opened, before the first shut-off valve 64 is opened and the second shut-off valve 66 is closed. This causes the brake releasing circuit 42 to be connected to the drain conduit 60 through valve 54. In this case brakes 36,38 and 40 will be applied at any rate.

Figure 2:
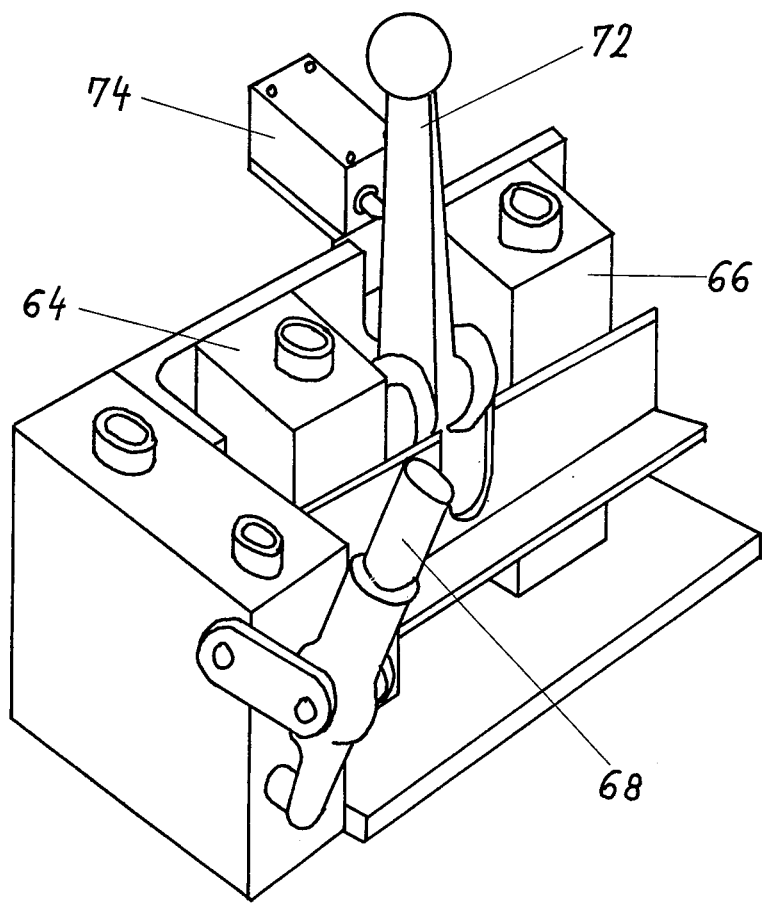
FIG. 2 is a perspective view and illustrates the structural arrangement of various components in the operator's compartment.

With the arrangement described braking of the towed construction machine is possible even during the towing procedure. To brake the machine, actuating lever 72 is shifted. To release the brakes, the auxiliary releasing pump 68 is actuated. To this end the actuating member 72 as a lever and the auxiliary releasing pressure pump 68 as treadle operated pump are arranged close to each other in the operator's compartment, as shown in FIG. 2.

Thus, the braking system for construction machines of the present invention is well adapted to carry out the objects and attain the ends and advantages mentioned, as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

I claim:

1. A braking system for a construction machine, comprising:
   a ground engaging drive means;
   a hydraulic drive system, including a hydraulic motor connected to said ground engaging drive means and a hydraulic pump for supplying fluid under pressure to said motor, said hydraulic drive system being constructed so that said drive means may be braked by varying the discharge volume of the hydraulic pump;
   an emergency brake, biased to apply a braking force to said ground engaging drive means;
   a means for shunting said hydraulic pump, said shunting means including a first valve, variable between a first position isolating an inlet and an outlet port of said pump and a second position connecting said inlet and outlet ports to shunt said pump;
   a means for releasing said emergency brake;
   a common actuating means, connected to said shunting means and releasing means, said actuating means being movable between a first position, wherein said hydraulic pump supplies fluid to drive said motor and said releasing means is actuated to release said emergency brake and a second position, wherein said hydraulic pump is shunted and said releasing means is deactivated so that said emergency brake acts to retard the motion of said ground engaging drive means.

2. Apparatus of claim 1, wherein:
   said emergency brake is mechanically biased in a brake applying direction; and
   said releasing means is a hydraulic brake release means including a means for providing pressurized hydraulic fluid to a hydraulic actuating member connected to said emergency brake to release said emergency brake upon the application of fluid pressure.

3. Apparatus of claim 2, wherein:
   said releasing means includes a second valve, variable between a first position, connecting said hydraulic actuating member to a source of fluid under pressure, and a second position isolating said actuating member from said source.

4. Apparatus of claim 3, wherein:
   said common actuating means is connected to said first and second valves, so that the first and second positions of said common actuating means correspond to the first and second positions, respectively, of each of said valves.

5. Apparatus of claim 4, wherein:
   said actuating means includes an actuating lever.

6. Apparatus of claim 2, further comprising:
   an auxiliary pump, for supplying hydraulic fluid to said hydraulic brake release means when said actuating means is in said second position, so that said emergency brake may be released to permit said construction machine to be towed.

7. Apparatus of claim 6, wherein:
said auxiliary pump is constructed to be driven by muscular power.

8. Apparatus of claim 2, further comprising:
means for relieving fluid pressure from said releasing means; and
means for activating said fluid pressure relieving means as said common actuating means is moved from said first position to said second position, so that said fluid pressure is substantially relieved from said releasing means before said actuating means reaches said second position.

9. Apparatus of claim 8, wherein:
said means for providing pressurized hydraulic fluid to a hydraulic actuating member includes a second pump, first conduit means for connecting said second pump to said hydraulic actuating member, and a valve disposed in said first conduit means, said valve being variable between a first position, placing said actuating member in fluid communication with said second pump, and a second position isolating said hydraulic actuating member from said second pump;
said relieving means includes a second conduit means, a first end of which communicates with a relatively low pressure hydraulic fluid reservoir; and
said activating means includes a means for placing a second end of said second conduit means in fluid communication with said first conduit means.

10. Apparatus of claim 9, wherein:
said second end of said second conduit means is connected to said first conduit means between said second pump and said valve.

11. Apparatus of claim 1, further comprising:
an auxiliary emergency brake release, for releasing said emergency brake when said actuating means is in said second position.

12. A braking system for a construction machine, comprising:
a ground engaging drive means;
a hydraulic motor connected to said drive means;
a first hydraulic pump for supplying pressurized fluid to said motor, said first pump and motor being connected so that a braking force may be applied to said drive means by varying the discharge volume of said first pump;
a first valve, connected between an inlet and an outlet of said first pump, for shunting said first pump when said first valve is open;
an emergency brake on said ground engaging drive means, constructed so that said emergency brake is biased in a brake applying direction in the absence of a brake releasing force;
a second hydraulic pump, for supplying hydraulic fluid under pressure to a hydraulic actuating means for applying a brake releasing force to said emergency brake;
a second valve;
a first conduit means, connecting an outlet of said second pump with said second valve;
a second conduit means, for connecting said second valve to said hydraulic actuating means;
a common valve actuating means, connected to said first and second valves, said common valve actuating means being variable between a first position, wherein said first valve is closed and said second valve is open, and a second position, wherein said first valve is open and said second valve is closed;
a control valve, disposed in said first conduit means, variable between a first position, connecting said second pump to said second valve, and a second position isolating said second pump from said second valve and connecting said second valve to a relatively low pressure fluid outlet;
a means for sensing movement of said common valve actuating means, between its said first and second positions; and
a means for moving said control valve to its said second position before said second valve is closed.

13. Apparatus of claim 12, further comprising:
a third pump for supplying hydraulic fluid under pressure to said second conduit means when said second valve is closed.

14. Apparatus of claim 13, wherein:
said third pump is constructed to be driven by muscular power.

15. Apparatus of claim 12, further comprising:
a biased overflow valve, an inlet of which is connected to said first conduit means between said second pump and said control valve, and an outlet of which is connected to a relatively low pressure fluid reservoir, so that when said control valve is in said second position, the fluid output from said second pump is returned to said reservoir.

16. Apparatus of claim 12, wherein:
said means for moving said control valve includes an electrically operated solenoid, and said control valve is in said first position when said solenoid is energized.

17. Apparatus of claim 16, wherein:
said sensing means includes a switch arranged to energize said solenoid upon closing, and to de-energize said solenoid upon opening.

* * * * *